United States Patent [19]

Matsushiro et al.

[11] Patent Number: 4,972,330
[45] Date of Patent: Nov. 20, 1990

[54] CLIPPING PROCESS AND PROCESSOR

[75] Inventors: Nobuhito Matsushiro; Ikuo Oyake, both of Tokyo, Japan

[73] Assignee: Oki Electric Industry Co., Ltd., Tokyo, Japan

[21] Appl. No.: 354,978

[22] Filed: May 22, 1989

[30] Foreign Application Priority Data

Jun. 1, 1988 [JP] Japan .................................. 63-132848

[51] Int. Cl.⁵ .............................................. G06F 3/00
[52] U.S. Cl. ..................................... 364/521; 364/518; 340/723
[58] Field of Search ........................ 364/518, 521, 522; 340/723, 729, 724, 730

[56] References Cited

U.S. PATENT DOCUMENTS 4,412,296 10/1983 Taylor .................................. 364/521
4,888,712 12/1984 Barkans et al. ..................... 364/521

OTHER PUBLICATIONS

"Fundamentals of Interactive Computer Graphics", by James D. Foley and Andries Van Dam, pp. 450–456; The Addison Wesley Publishing Company, 1984.

*Primary Examiner*—Arthur G. Evans
*Attorney, Agent, or Firm*—Spencer & Frank

[57] ABSTRACT

A clipping processor clips a two-dimensional subject figure against a clip region by first scan-converting the clip region and storing it as endpoint data of clip segments, then scan-converting the subject figure, clipping the subject segments a scan line at a time against each of the clip segments on that scan line, and converting the clipped segments to pixel data. The clipping process is thus efficiently combined with the standard processes of scan conversion and pixel generation, producing clipped data that are ready for raster output. The clipping process is moreover performable by simple, rapid DDA algorithms, even when the clip region is bounded by high-order curves such as Bezier curves and spline curves, and can easily be implemented in high-speed, dedicated hardware.

16 Claims, 10 Drawing Sheets

CONTROL DATA

SEGMENT DATA

CLIPPING PROCESS AND PROCESSOR

BACKGROUND OF THE INVENTION

This invention relates to a clipping process for clipping a two-dimensional subject figure such as a graphic primitive or image against a clip region bounded by a clip boundary of arbitrary shape, and to a clipping processor for executing this process.

Clipping is the process of modifying a subject figure by retaining the part disposed inside a given clip boundary and removing the part disposed outside the clip boundary. The subject figure may be a graphic image or a primitive element thereof, such as a line, polygon, circle, or bitmapped character. Clipping is extensively employed in computer graphics and image processing, in computer operating systems that display windows, and in printers such as laser printers.

The prior art in this field is described in *Fundamentals of Interactive Computer Graphics* by J. D. Foley and A. van Dam, published by the Addison Wesley Publishing Company in 1984. Two clipping algorithms are disclosed therein, one due to Sutherland and Hodgman and another due to Weiler and Atherton, both of which clip a subject polygon described by a vertex list against a polygonal clip boundary. Both algorithms trace around the border of the subject polygon to find its intersections with the clip boundary and construct a new vertex list comprising the intersections thus found, plus such vertices of the subject polygon or clip boundary as may be necessary. The clipped subject polygon is then converted from this new vertex list to a form suitable for output by a raster output device such as a printer or cathode-ray tube (CRT) display. Specifically, the clipped polygon is converted to the device coordinate system, then filled with pixels and stored as a pixel map in a drawing memory such as a refresh buffer or frame buffer.

One problem with the prior art is that the algorithms described above cannot be easily extended to the case in which the boundary of the subject figure, or the clip boundary, or both, is a high-order curve such as the cubic Bezier curves and spline curves frequently employed in computer graphics. Finding the intersections in this case requires the solution of high-order algebraic equations, a process which is difficult and time-consuming and not suitable for implementation in special-purpose hardware.

Approximating such curves by polygons does not help, because to achieve a reasonably close approximation, the approximating polygon must have a large number of vertices. Since the above algorithms test each edge of the subject polygon against each edge of the clip boundary, and compute the coordinates of each point of intersection, they take much time to process a long vertex list. If the number of vertices is reduced to shorten the processing time, the approximation becomes crude and the quality of the output image suffers.

Another problem with the prior art is its unsatisfactory performance in handling highly irregular polygonal clip boundaries. The source of this problem is again the inordinate time taken to process a long vertex list. Further problems arise when the clip boundary is a self-intersection polygon, or comprises two or more independent polygons: for example, when the clip region has interior holes. In this case complications are introduced by the need to decide between the inside and outside of the clip region, and to make this decision at each point of intersection.

A more fundamental problem is that the prior-art clipping process is unrelated to the raster output process. The clipping process is therefore completely distinct from the process of converting the clipped figure to the pixel form acceptable by a raster output device. Performing these two processes separately takes extra time, and requires separate processors.

SUMMARY OF THE INVENTION

It is accordingly an object of the present invention to clip an arbitrary subject figure against an arbitrary clip boundary by simple, rapidly performable operations.

A further object of this invention is to perform the clipping process in a manner closely related to the raster output process.

This invention provides both a clipping process and a clipping processor.

The clipping process comprises the steps of:

(a) Receiving information defining a clip region in x-y coordinates, creating control data therefrom, and storing the control data in a segment data control memory;

(b) scanning the clip region, decomposing it into clip segments extending in the x-direction, creating clip segment data for the clip segments, and storing the clip segment data in a segment memory;

(c) initializing a scan-line y-coordinate to the smallest y-coordinate of the clip region;

(d) scanning a subject figure to obtain subject segments on the scan line with the scan-line y-coordinate;

(e) reading clip segment data for this scan line from the segment memory, generating clipped segments by clipping the subject segments against the clip segment data, converting the clipped segments to pixel data, and outputting the pixel data;

(f) deciding whether the subject figure has been completely scanned; and (g) if the subject figure has not been completely scanned, incrementing the scan-line y-coordinate by one and returning to step (d).

The clipping processor comprises:

a bus for the interchange of data and address information among the elements described below;

a scan converter for scan-converting a clip region and subject figure, decomposing them into clip segments and subject segments, respectively, extending on scan lines in the x-direction in an x-y coordinate system, and generating clip segment data and subject segment data;

a segment memory for storing the clip segment data;

a segment data control memory for storing control data describing the structure of the segment memory;

a clipper for receiving subject segment data for the subject segments disposed on one scan line from the scan converter, receiving clip segment data describing a clip segment disposed on the same scan line from the segment memory, and generating clipped segments comprising those portions of the subject segments that are common to the clip segment;

a segment-to-pixel converter for receiving the clipped segments from the clipper, converting them to pixel data, and outputting the pixel data;

an arithmetic and logic unit for performing arithmetic and logic operations when requested by other elements of the clipping processor; and a control unit for controlling the scan converter, clipper, and segment-to-pixel converter, and controlling access to the segment memory according to data stored in the segment data control memory.

DETAILED DESCRIPTION OF THE EMBODIMENTS

A novel clipping process and novel clipping processor embodying the present invention will be described below with reference to the drawings.

The novel clipping process can be summarized as follows. The process operates on a subject figure and a clip region, both of which may be given by boundary information such as a vertex list or a set of parametrized curves, and generates a clipped figure in pixel form suitable for output by a raster output device. The boundary of the clip region, referred to as the clip boundary, is in general a closed polygon or curve. The process begins by scan-converting the clip region, thereby decomposing it into segments disposed on the scan lines of the raster output device, and storing clip segment data for these segments. Then it similarly scan-converts the subject figure and clips each of the resulting subject segments against the clip segment data for the same scan line. Finally, it converts the clipped segments to pixel data.

The novel clipping processor comprises a control unit, a clipper, converters, memory, and other units necessary for carrying out the novel clipping process.

The novel clipping processor will be described with reference to FIGS. 1 to 4. The novel clipping process will be described with reference to FIGS. 5 to 13. Variations of the novel clipping processor and process will be described with reference to FIGS. 14 and 15.

The description will deal specifically with the case in which the subject figure is a graphic primitive comprising an area bounded by, for example, a polygon or an elementary curve such as a circle, ellipse, Bezier curve, or spline curve. The clip boundary will also be assumed to be a polygon or curve of this type, and will be assumed to be closed.

Figures 1, 2:
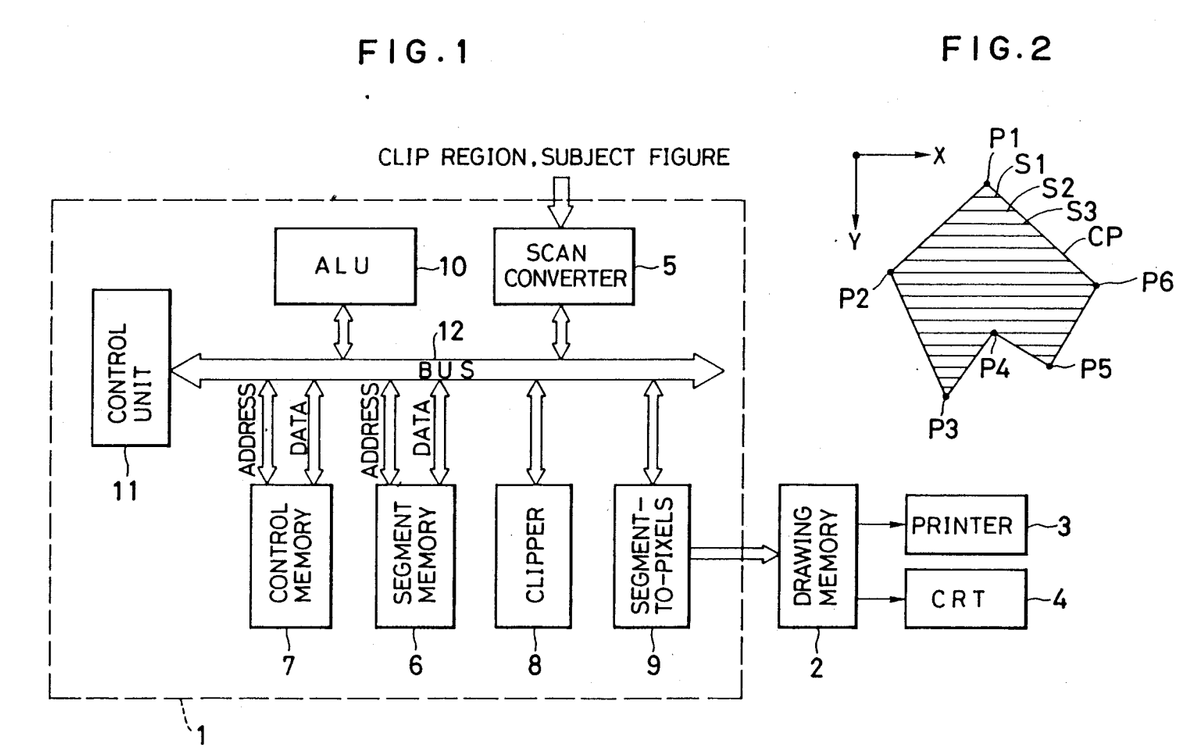
FIG. 1 is a block diagram of the novel clipping processor.
FIG. 2 is a schematic drawing illustrating the segmentation of the clip region.

FIG. 1 is a block diagram of a novel clipping processor 1 which receives a subject figure and a clip region, clips the subject figure against the clip region, and converts the clipped subject figure to pixels which it generates as output. The output pixels may be stored in a drawing memory 2, from which they can be read out in raster sequence and furnished to raster output device such as a printer 3 or CRT display 4 to be printed or displayed.

The clipping processor 1 comprises a scan converter 5, a segment memory 6, a segment data control memory 7, a clipper 8, a segment-to-pixel converter 9, an arithmetic and logic unit (ALU) 10, and a control unit 11, all of which are interconnected by a bus 12.

The scan converter 5 receives the subject figure and clip region, decomposes them into segments disposed on the scan lines of the raster output device, and generates segment data as output. The segments of the clip region will be referred to as clip segments, and their data as clip segment data. The segments of the subject figure will be referred to as subject segments, and their data as subject segment data. The scan converter 5 can be embodied either in special-purpose hardware, or in software executing on, for example, a general-purpose microprocessor with memory.

The segment memory 6 stores the clip segment data obtained by the scan converter 5. The segment memory 6 comprises memory elements such as RAM chips, or portions thereof.

The segment data control memory 7 stores various data generated by the control unit 11, needed when the segment memory 6 is accessed. The segment data control memory 7 comprises memory elements such as RAM chips, or portions thereof.

The clipper 8 receives the subject segment data for one scan line from the scan converter 5 and the clip segment data for the same scan line from the segment memory 6, and generates output data describing the set of segments comprising the common parts of the subject segments and clip segments; that is, it clips the subject figure on one scan line. The clipper 8 can be embodied either in special-purpose hardware or in software executing on, for example, a general-purpose microprocessor.

The segment-to-pixel converter 9 receives the output data generated by the clipper 8 and generates pixel data for the segments described thereby. These pixel data are the final output of the clipping processor 1, which are furnished to the drawing memory 2. The segment-to-pixel converter 9 can be embodied either in special-purpose hardware or in software executing on, for example, a general-purpose microprocessor.

The control unit 11 has an internal program memory storing instructions for executing the programs shown in FIGS. 5, 6, 7, and 12, according to which it controls the preceding functional blocks. The control unit 11 can be embodied either in special-purpose hardware or in general-purpose hardware such as a microprocessor with read-only memory elements.

The arithmetic and logic unit 10 performs arithmetic and logic operations requested by the scan converter 5, the clipper 8, the segment-to-pixel converter 9, and the control unit 11, furnishing the results to the requesting unit. The arithmetic and logic unit 10 is embodied in special-purpose hardware.

Detailed descriptions of the special-purpose hardware, software, general-purpose microprocessor, and memory elements mentioned above will be omitted, because all are well known and their structure will be apparent to one skilled in the art.

A more detailed description of the data structure of the segment memory 6 and the segment data control memory 7 will be furnished below. First, however, it is necessary to give a brief explanation of the scan conversion of the clip region with reference to FIG. 2.

FIG. 2 shows a clip region CP bounded by a simple polygon with vertices P1, P2, . . . , which are given by coordinates in an x-y coordinate system. The scan converter 5 decomposes the clip region CP into segments S1, S2, . . . along the scan lines of a raster output device (the printer 3 or CRT 4 in FIG. 1), which extend in the x-direction, and generates data describing each segment by giving its starting and ending points. In FIG. 2 the clip region is scanned in the positive y-direction, from top to bottom, this being the increment direction of the scan lines. The x-direction will be referred to as the raster-line direction or scan-line direction.

The verticles of the clip region are of three types: leading vertices, trailing vertices, and other vertices. A leading vertex is a local peak of the boundary line with respect to the negative y-direction; in FIG. 2 the vertices P1 and P4 are leading vertices. A trailing vertex is a local valley of the boundary line with respect to the negative y-direction; in FIG. 2, the vertices P3 and P5 are trailing vertices.

It is apparent that when the clip boundary is traced in a certain direction, such as the counterclockwise direction, leading and trailing vertices must follow each other alternately, for the same reason that peaks alternate with valleys in a mountain range. More precisely, when a leading vertex is encountered, the boundary line turns down. Since the boundary is a closed curve, it must eventually turn upward again, the point at which it turns upward being a trailing vertex. Similarly, after turning upward, the boundary line must turn down again, the point at which it turns down being a leading vertex.

It follows that the leading and trailing vertices form pairs comprising a leading vertex and the trailing vertex that follows it when the boundary is traced in a certain direction. In FIG. 2, if the tracing direction is counterclockwise, the leading vertex P1 and the trailing vertex P3 form a pair, and the leading vertex P4 and the trailing vertex P5 form a pair. If the tracing direction is clockwise, the leading vertex P1 and the trailing vertex P5 form a pair, and the leading vertex P4 and the trailing vertex P3 form a pair.

(To ensure correct pairing, boundaries such as rectangles that comprise horizontal lines require special consideration. For example, a leading vertex can be defined as a vertex that is higher than the preceding vertex and not lower than the following vertex, and a trailing vertex as a vertex that is lower than the preceding vertex and not higher than the following vertex.)

It can also be seen from FIG. 2 that the section of the clip boundary from a leading vertex to the next trailing vertex meets a number scan lines equal to the difference between the y-coordinates of the leading vertex and the trailing vertex, plus one. In the segment decomposition, this number is the number of segments meeting that section of the boundary line. It is also apparent that each segment meets just one such a section of the boundary line. If the boundary line is traced in the counterclockwise direction, for example, then each segment meets such a section of the boundary line at its left end. Hence the total of these numbers for all the leading and trailing vertex pairs is equal to the total number of segments in the segment decomposition.

Curved boundaries can be handled in the same way as polygons, with leading and trailing vertices defined similarly as local peaks and valleys.

The data structure of the segment memory 6 will now be described with reference to FIG. 3.

Figures 3, 4:
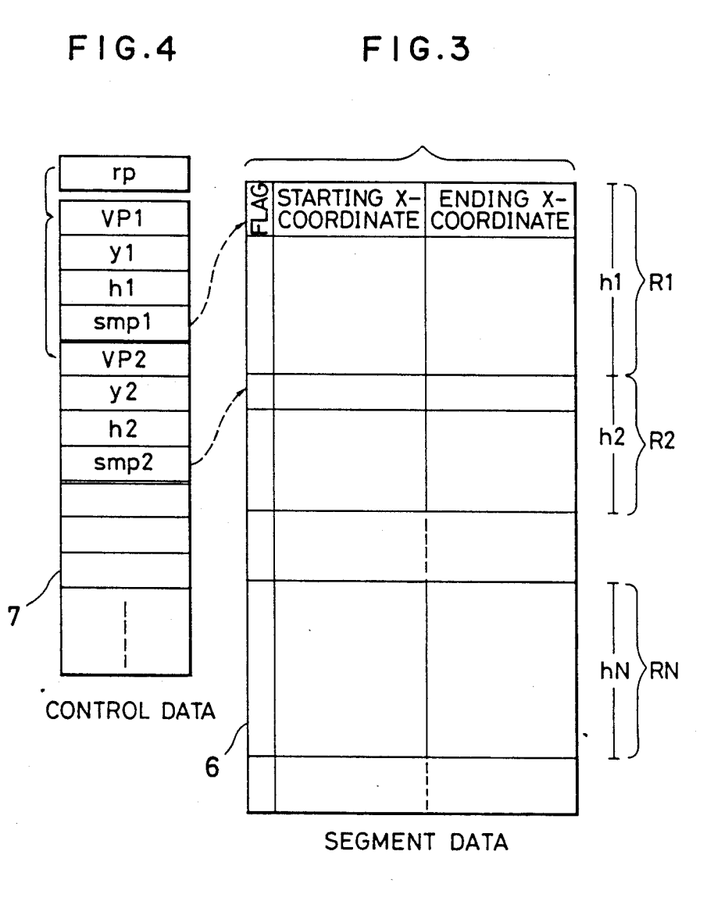
FIG. 3 is a schematic drawing showing the structure of the segment memory in FIG. 1.
FIG. 4 is a schematic drawing showing the structure of the segment data control memory in FIG. 1.

In the memory area addressed by a single address in FIG. 3 are stored a flag indicating whether or not a word of clip segment data is stored in that memory area, and a word comprising the x-coordinate of the clip segment starting point and the x-coordinate of the clip segment ending point. The x-y coordinate system is as shown in FIG. 2. Segment data like this are stored for all of the segments into which the clip region is decomposed.

The segment memory 6 is partitioned into regions Ri corresponding to the pairs of leading and trailing vertices. Each region Ri stores segment data for hi clip segments, where hi is one more than the difference between the y-coordinate of the leading vertex and the y-coordinate of the trailing vertex.

When two or more clip segments are disposed on the same scan line, their segment data are stored in different regions Ri.

Next the data structure of the segment data control memory 7 will be described with reference to FIG. 4.

The segment data control memory 7 stores pointers and other control data for accessing the clip segment data in the segment memory 6. More specifically, it stores a pointer to the top of each region Ri in the segment memory 6, and data indicating the range of y-coordinates of the clip segments described in that region.

The stored data explicitly comprise a root pointer rp, leading vertex pointers vpi, leading-vertex y-coordinates yi, word lengths hi of the regions, and segment memory pointers smpi. Except for the root pointer rp, these data data are stored in respective blocks for the regions Ri in the segment memory 6.

The root pointer rp is a pointer to the first leading vertex pointer vp1.

The leading vertex pointers vpi are a chain of pointers linking the blocks in ascending order of their leading-vertex y-coordinates yi, and are used to search the blocks sequentially in the increment direction of the scan lines.

The leading-vertex y-coordinate yi is the y-coordinate of the first clip segment stored in region Ri in the segment memory 6. It is used together with the word length hi to decide whether the region Ri contains clip segment data for a specific y-coordinate, and together with the segment memory pointer smpi to calculate the address of those clip segment data if present.

The word length hi is the number of words in region Ri in the segment memory 6.

The segment memory pointer smpi is a pointer to the top of the region Ri in the segment memory 6.

Next a description of the novel clipping process will be given. This description will also serve as a description of the operation of the novel clipping processor.

Figure 5:
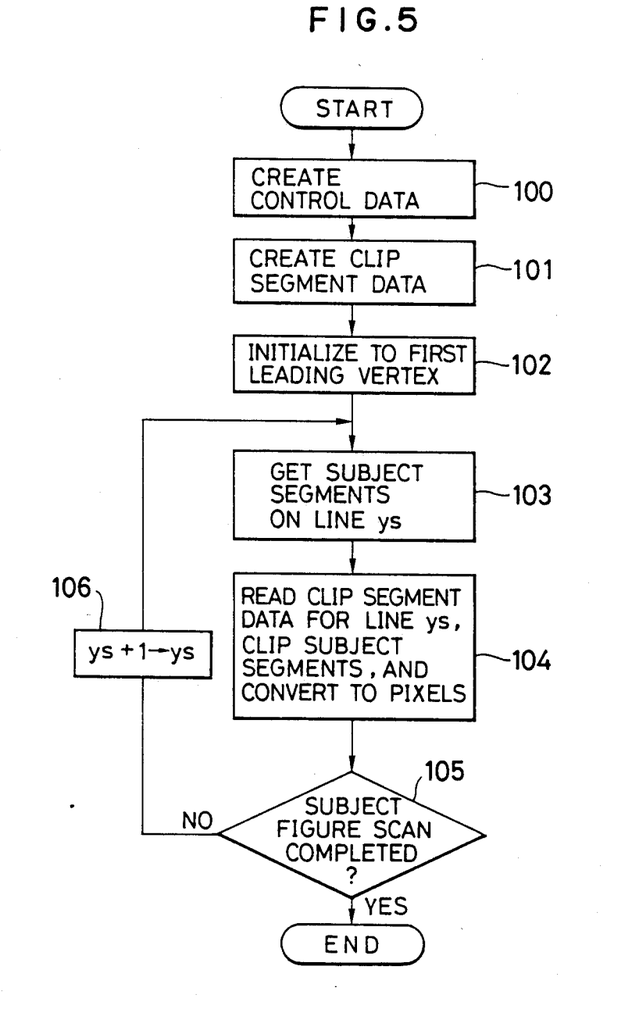
FIG. 5 is a general flowchart of the novel clipping process.

First a general description of the novel clipping process will be given with reference to the flowchart in FIG. 5.

The process begins with the creation of control data and the storage of these control data in the segment data control memory 7 (step 100). The details of this process will be shown in the flowchart in FIG. 6.

Next, the clip region is scanned and decomposed into clip segments, and clip segment data are created and stored in the segment memory 6 (step 101), using the control data created in the preceding step. The details of this process will be shown in the flowchart in FIG. 7.

When the clip segment data and the control data needed for accessing these data have been created and stored, the scan-line y-coordinate ys is initialized to the leading-vertex y-coordinate having the smallest value (step 102).

Next, the subject figure is scanner to find the subject segments thereof which are disposed on the scan line with y-coordinate ys (step 103). Then the clip segment data for this scan line are read from the segment memory 6 using the control data in the segment data control memory 7; the subject segments are clipped to extract the parts they have in common with the clip segments; and the extracted, clipped segments are converted to pixel data and output (step 104). Details of this segment clipping process will be shown in the flowchart in FIG. 12 and schematic diagram in FIG. 13.

When the clipping of segments on a single scan line has been completed in this way, a decision is made as to whether the entire subject figure has been scanned; more specifically, whether the clipping process has been completed for all scan lines that intersect the subject figure and the clip region (step 105). If the decision result is negative, the scan-line y-coordinate ys is incremented to the next y-coordinate value (step 106) and the proces returns to step 103. If the decision result is affirmative, the clipping process terminates.

Next the creation of data for the segment data control memory 7 carried out in step 100 in FIG. 5 will be described in detail with reference to FIG. 6. The strategy followed in this process is to proceed around the clip boundary in, for example, the counterclockwise direction, consider successive vertices, and identify pairs of leading and trailing vertices. For each pair of leading and trailing vertices identified, a leading-vertex y-coordinate yi, word length hi, and segment memory pointer smpi are calculated and stored in the segment data control memory 7, together with a leading vertex pointer vpi.

First the clip region is input and its boundary data are structured in a form suitable for later processing and temporarily stored (step 120). If the clip region is a polygon given by a vertex list, the vertex list reordered in, for example, the counterclockwise direction.

Figure 6:
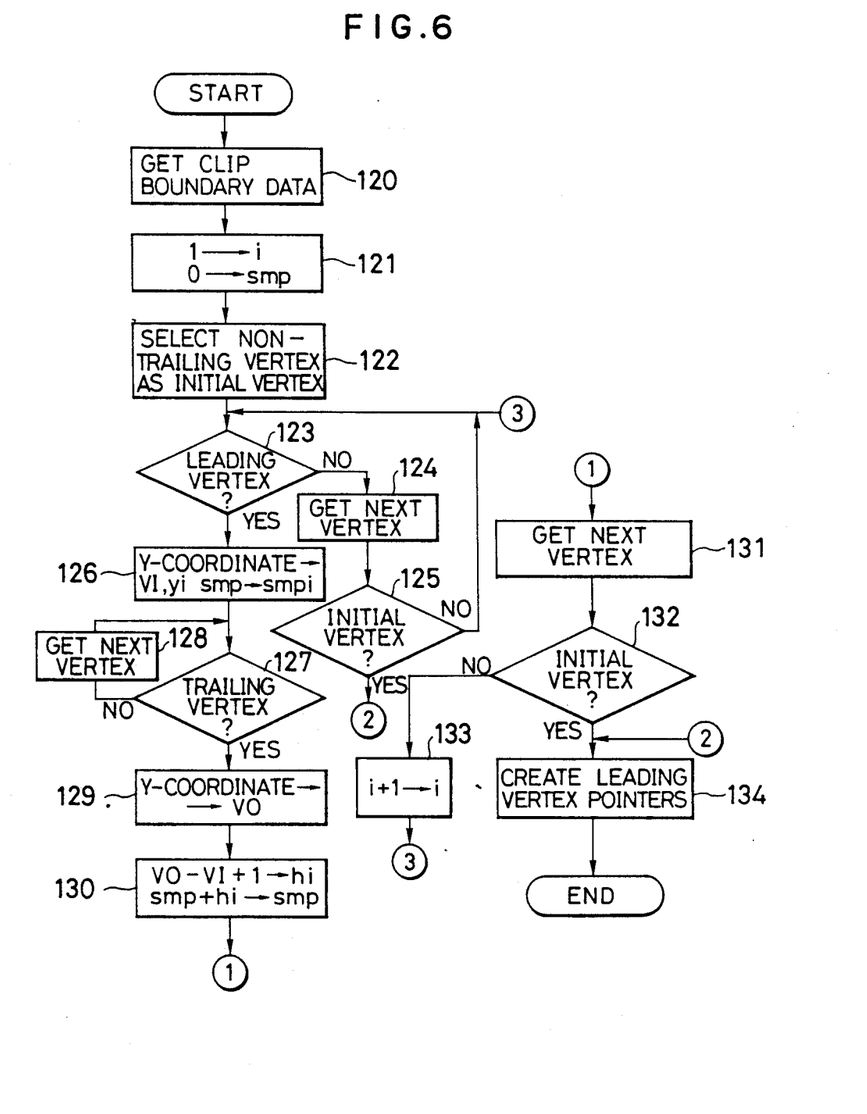
FIG. 6 is a more detailed flowchart of the process of creating data for the segment data control memory.

Next an index parameter i indicating a region in the segment memory 6 is initialized to 1, thus indicating the region R1, and a segment memory parameter smp is initialized to the top address of the segment memory, for example the address 0 shown in FIG. 6 (step 121).

Next the clip boundary is traced in the counterclockwise direction, for example, and a vertex that is not a trailing vertex is selected as the initial vertex (step 122), also becoming the current vertex under consideration at this point.

When this initialization is complete, a decision is made as to whether the current vertex is a leading vertex or not (step 123). If the result of this decision is negative, the next vertex reached in the counterclockwise direction from that vertex is taken as the current vertex (step 124) and a decision is made as to whether it is the initial vertex (step 125). If it is not the initial vertex, the process returns to step 123. Steps 123 to 125 are repeated until a leading vertex is found, giving an affirmative result in step 123. If the initial vertex is found, giving an affirmative result in step 125, the process proceeds to step 134 described later.

When a leading vertex is found in this way, its y-coordinate is stored in the segment data control memory 7 as the leading-vertex y-coordinate yi of the i-th region Ri, and is temporarily stored as an initial y-parameter VI to be used in the calculation of the word length hi described later. The value of the segment memory parameter smp is stored in the segment data control memory 7 as the segment memory pointer smpi to the region Ri (step 126).

Next a decision is made as to whether the current vertex is a trailing vertex or not (step 127). If the decision result is negative, the next vertex reached in the counterclockwise direction from the vertex on the boundary is taken as the current vertex and the process returns to step 127 (step 128). Repetition of this process leads to the finding of the trailing vertex paired with the leading vertex obtained in step 123, at which point an affirmative result is obtained in step 127.

The y-coordinate of this trailing vertex is stored as the final y-parameter VO (step 129). Then a word length hi is calculated from the afore-mentioned initial y-parameter VI and the final y-parameter VO according to the equation:

$$hi = VO - VI + 1$$

This value is stored in the segment data control memory 7 as the word length hi of the region Ri. This word length hi is also added to the segment memory parameter smp, updating the value of the segment memory parameter smp for use with the next pair of leading and trailing vertices (step 130).

When the leading-vertex y-coordinate yi, the word length hi, and the segment memory pointer smpi for the region Ri have thus been stored in the segment data control memory 7, the next vertex in the counterclockwise direction around the clip region is taken as the current vertex (step 131) and a decision is made as to whether or not this vertex is the initial vertex selected in step 122 (step 132).

If the result of this decision is negative, the index parameter i is incremented and the process returns to step 123, to find the leading and trailing vertices of the next region Ri and store control data for that region Ri in the segment data control memory 7 (step 133).

If the result of this decision is affirmative, indicating that a complete circuit of the clip boundary has been made, leading vertex pointers vp1 to vpn are created, linking the blocks of control data for the regions Ri in ascending order of their leading-vertex y-coordinates yi. In addition, the address of the first leading vertex pointer vp1 is stored in the root pointer rp (step 134). This completes the creation of control data for the segment data control memory 7.

Figure 7:
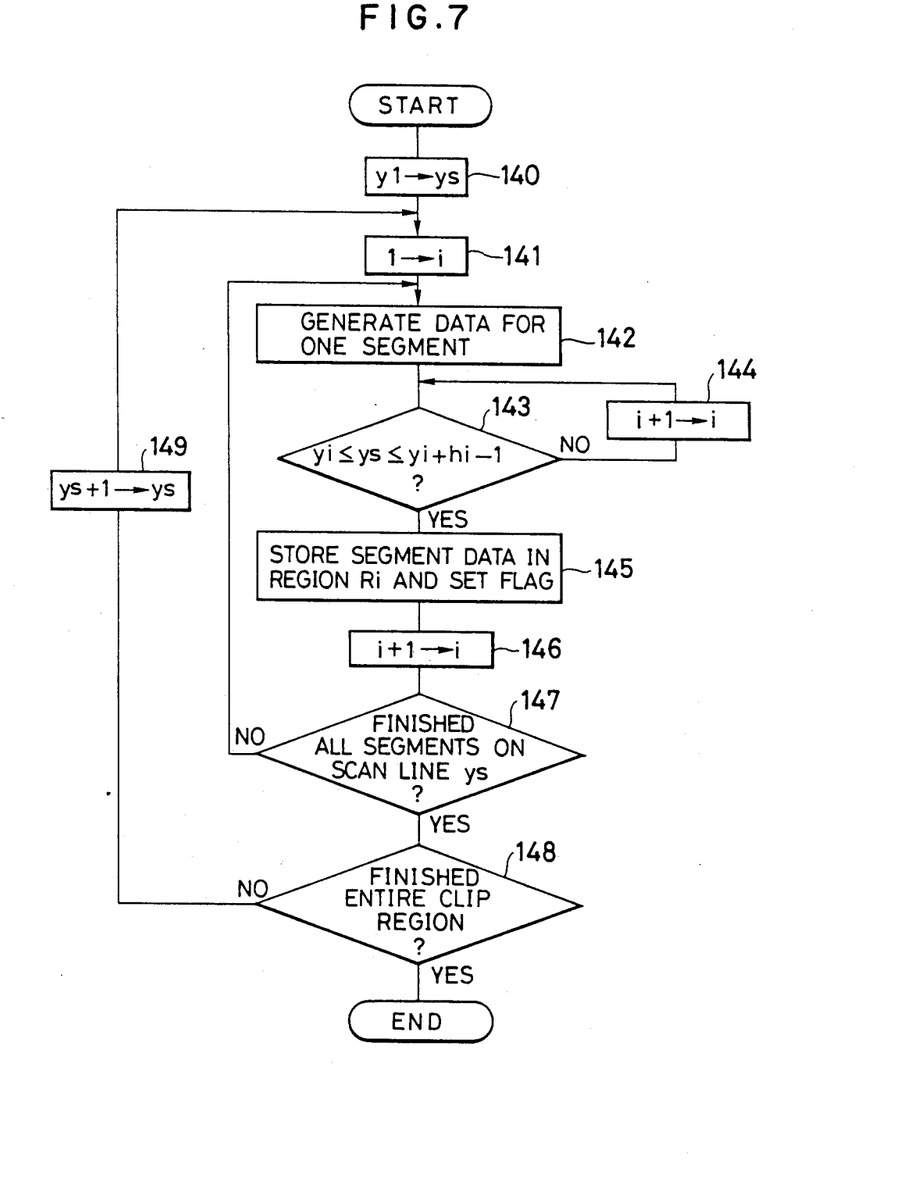
FIG. 7 is a more detailed flowchart of the process of creating data for the segment memory.

Next the detailed proces of decomposing the clip region into segment data and storing the segment data thus created in the segment memory 6 (step 101 in FIG. 5) will be described with reference to FIG. 7. In this process the clip region is scanned and decomposed into clip segments; the x-coordinates of the starting and ending points of these clip segments are stored in the segment memory 6 at an address calculated from the y-coordinate of the clip segment, a segment memory pointer smpi, and a leading-vertex y-coordinate yi; and a flag is set to indicate that clip segment data have been stored at this address.

First, the scan-line y-coordinate ys is set to the smallest y-coordinate in the clip region (step 140). Specifically, the root pointer rp in the the segment data control memory 7 is read to obtain the address of the first word in the first control data block (the word containing the leading vertex pointer vp1), and the value in the next word, this being the leading-vertex y-coordinate y1, is assigned to ys. Then the index parameter i is initialized to its initial value of 1 (step 141).

Next, the data for one clip segment on that scan line are generated, comprising the x-coordinate of the starting point and the x-coordinate of the ending point (step 142).

If the clip segment is a point (vertex), the same value is generated for the x-coordinates of the starting and ending points. If it is a segment of finite length and the clip boundary is a polygon, the segment data are generated by a well-known digital differential analyzer (DDA) algorithm. If the boundary line follows a Bezier curve or spline curve, the segment data are generated by a suitable modification of the difference in the well-known forward difference algorithm, which is a type of DDA algorithm. Either the even-odd algorithm or the non-zero-winding algorithm is applied to make the necessary discrimination between the inside and outside of the clip region. The DDA, even-odd, and non-zero winding algorithms will be described later.

A decision is next made as to whether the scan-line y-coordinate ys is equal to or greater than the leading-vertex y-coordinate yi and equal to or less than the y-coordinate (yi+hi−1) of the trailing vertex paired with that leading vertex; that is, whether region Ri of the segment memory 6 has a word available in which to store the segment data (step 143). If a negative result is obtained, the index parameter i is incremented and the process returns to step 143 to test the next region Ri (step 144).

It should be understood that whenever the index parameter i is incremented, the current leading vertex pointer vpi is first read to obtain the address of the next bloc of control data. Explicit mention of the reading of leading vertex pointers will be omitted hereinafter.

When a region Ri with an available word is found in this way, an address ad is calculated from the current scan-line y-coordinate ys, the leading-vertex y-coordinate yi of the region Ri, and the segment memory pointer smpi according to the following equation:

$$ad = ys - yi + smpi$$

The segment data are stored in the word at this address in the segment memory 6, and the flag of this address is set (step 145).

Next the index parameter i is incremented (step 146), and a decision is made as to whether or not data have been created for all segments on the current scan line (step 147). If a negative result is obtained, the process returns to the above-described step 142 and the same process is repeated for the next segment on the scan line.

When it is determined that data have been created for all the segments on the current scan line, a decision is made as to whether this process has been completed for all scan lines that intersect the clip region (step 148). If it has not, the scan-line y-coordinage ys is incremented and the process returns to step 141 above to create and store data for the segments on the next scan line.

When data for all segments on all scan lines intersecting the clip region have been created and stored, giving an affirmative result in step 148, the process ends.

Normally this process results in the storage of hi words of clip segment data in respective regions Ri in the segment memory 6, because hi is equal to the difference between the y-coordinates of the i-th leading and trailing vertices plus 1, as calculated in step 130 in FIG. 6, and this is also the number of clip segments meeting the clip boundary between those two vertices, as pointed out in FIG. 2. The data structure of the segment memory 6 thus normally provides exactly enough space to store all the clip segment data. It never provides less than enough space. In special situations described later it may provide excess space, in which case unoccupied words can be identified by their flags.

Next the DDA algorithm employed in step 142 to generate segment data in the case of a polygonal clip boundary will be briefly described with reference to FIG. 8.

Figure 8:
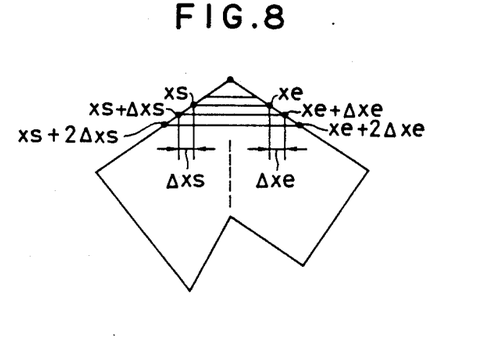
FIG. 8 is a schematic drawing illustrating the creation of segment data by a DDA algorithm.

In FIG. 8, suppose that the x-coordinates xs and xe of the starting and ending points of a segment in a certain scan line have already been generated. The DDA algorithm generates the x-coordinates of the starting and ending points of the segment below this segment in the next scan line by adding an increment Δxs to the value of xs and an increment Δxe to the value of xe. In FIG. 8 Δxs is negative and Δxe is positive. Further segments are obtained in the same way. The values of Δxe and Δxs depend on the slope of the boundary lines and are adjusted to integer values compatible with raster output by tracking the error between the integar values and the true values.

The DDA algorithm thus obtains each segment from the segment above it by simple addition and subtraction operations, which can be carried out repidly and are suitable for implementation in special high-speed computational hardware.

In addition to generating segments, it is necessary to check whether each segment lies inside or outside the clip region. A description will next be given of the algorithms employed for this purpose. This description will mention the case of self-intersecting clip boundaries and show that even in such cases, the data structures of the segment memory 6 and segment data control memory 7 provide enough memory space for the storage of all clip segment data.

Figure 9:
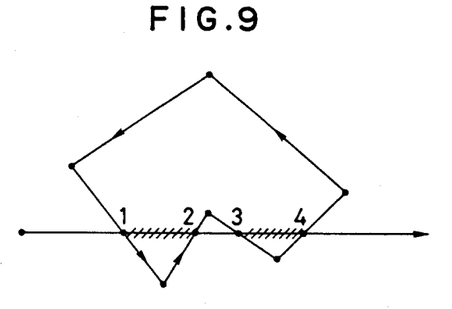
FIG. 9 is a schematic drawing illustrating the even-odd algorithm.

One method of discriminating the inside and outside of the clip region is the even-odd algorithm illustrated in FIG. 9, which consists in drawing a ray from a base point definitely located outside the clip region and counting its intersections with the clip boundary, starting from the base point. The interval from a boundary position where the count is odd to the next boundary position where the count becomes even is determined to lie inside the clip region.

When the even-odd algorithm is used to generate segments, the rays are directed in the scan-line direction. A ray intersecting the clip boundary at 2n points generates n segments. Consider a pair of scan lines disposed just above and below a leading vertex; it is evident that the lower scan line will have two more intersections than the upper one, hence it will generate one more segment than the upper one. Similarly, a scan line disposed just below a trailing vertex will have one less segment than the scan line disposed just above that trailing vertex. It follows that when segments are generated using the even-odd algorithm, the i-th pair of leading and trailing vertices will give rise to a number of segments equal to the difference between their y-coordinates plus one, which is the value hi. The amount of segment data generated will therefore exactly fill the space allocated in the segment memory 6.

Figure 10:
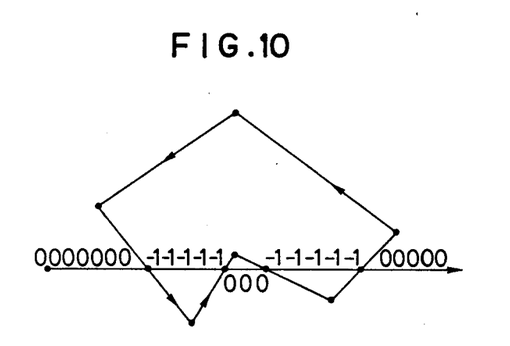
FIG. 10 is a schematic drawing illustrating the non-zero-winding algorithm.

An alternative method of discriminating inside and outside of the clip region is the non-zero-winding algorithm illustrated in FIG. 10. This algorithm considers a ray extending from a base point disposed definitely outside the clip region, and assigns a decision parameter to each point on the ray by assigning the decision parameter 0 to the base point, decrementing the decision parameter by −1 whenever the clip boundary crosses the ray in the downward direction, incrementing the decision parameter by 1 whenever the boundary crosses the ray in the upward direction, and not changing the decision parameter at other points on the ray. The part where the decision parameter is 0 is determined to be outside the boundary and the part where it is not 0 is determined to be inside.

The non-zero-winding algorithm normally gives the same results as the even-odd algorithm, generating exactly enough segment data to fill the segment memory 6.

For a self-intersecting clip boundary, however, the even-odd and non-zero-winding algorithms may produce different results. Consider for example the clip boundary illustrated in FIG. 11. On the scan line LS, the non-zero-winding algorithm treats the interval from P1 to P4 as a single segment, while the even-odd algorithm treats it as two segments, such as one segment from P1 to P3 and another from P2 to P4 (the intersections being marked as even or odd according to their order on the clip boundary rather than their order on the ray).

Figure 11:
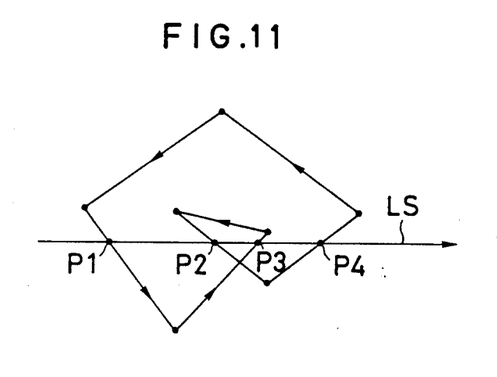
FIG. 11 is a schematic drawing illustrating a case in which the even-odd and non-zero-winding algorithms create different numbers of segments.

The non-zero-winding algorithm may thus give a smaller number of segments than the even-odd algorithm, but it never gives a larger number. The data structure of the segment memory 6 will therefore always be at least adequate to store the segment data generated using the non-zero-winding algorithm.

Figure 12:
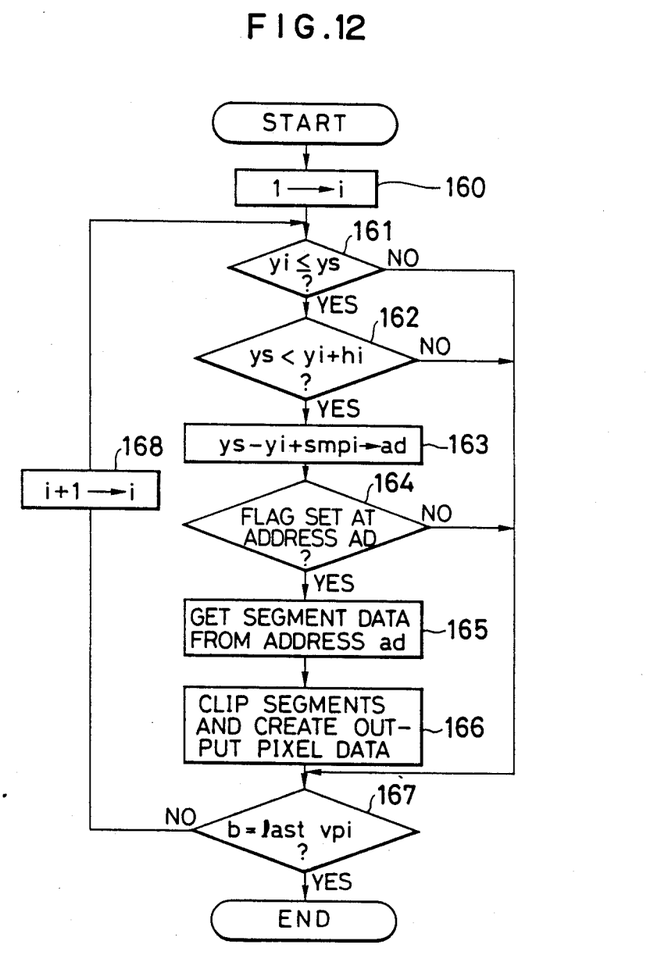
FIG. 12 is a more detailed flowchart of the process of clipping subject segments on one scan line.

Next the detailed process of reading the clip segment data for the scan line with y-coordinate ys from the segment memory 6 and clipping the subject segments on that scan line according to these segment data (step 104 in FIG. 5) will be described with reference to the flowchart in FIG. 12.

In this process, first the root pointer rp is fetched from the segment data control memory 7 and its value is assigned to a block parameter b indicating the address of a block of data in the segment data control memory 7 (step 160). The word after this address is then read to obtain a leading-vertex y-coordinate yi, and a decision is made as to whether the scan-line y-coordinate ys is equal to or greater than yi (step 161). If the decision result is negative, the process proceeds to step 167 described later. If the result is affirmative, the word length hi is added to yi and a decision is made as to whether or not the scan-line y-coordinate is strictly less than the result (step 162). Once again, if the result is negative, the process proceeds to step 167 described later.

The purpose of steps 161 and 162 is to determine whether or not region Ri of the segment memory 6 includes segment data for a clip segment having a y-coordinate equal to the scan-line y-coordinate ys. An affirmative result in step 162 indicates that such segment data may be present.

If an affirmative result is obtained in step 162, next a read address ad in the segment memory 6 is generated according to the following formula, using the segment memory pointer smpi (step 163):

$$ad = ys - yi + smpi$$

Next the flag at the address ad in the segment memory 6 is read to determine whether clip segment data are actually stored at this address (step 164). If the flag is not set, indicating that clip segment data are not stored, the process proceeds to step 167 described later. If the flag is set, indicating the presence of clip segment data, the segment data are read from address ad (step 165).

When the data for one clip segment on the current scan line have been obtained from the segment memory 6 in this way, the subject segments on this scan line are clipped against this clip segment and the clipped segments are converted to pixel data for output (step 166). This step will be described in more detail later.

when this step is completed, or when a negative result is obtained in step 161, 162, or 164 above, a decision is made as to whether or not the value of the block parameter b has reached the end of the chain of leading vertex pointers; that is, whether the current leading vertex pointer vpi is the last in the chain (step 167). If the result of this decision is negative, the value of the block parameter b is updated to the value stored in the current leading vertex pointer vpi, this being the address of the next block of control data in the segment data control memory 7 (step 168); then the process returns to the step 161 to test for the presence of clip segment data for this scan line in the next region Ri.

The process ends when an affirmative result is obtained in step 167, indicating that clipping of the current scan line and output of pixel data for this scan line have been completed.

Figure 13:
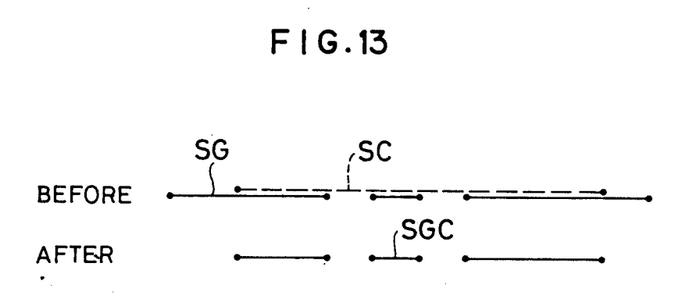
FIG. 13 is a schematic diagram illustrating the clipping of subject segments against a clip segment.

The process of clipping the subject segments on one scan line against a clip segment read from the segment memory 6 is illustrated schematically in FIG. 13. The starting and ending points of each subject segment SG are compared with the starting and ending points of the clip segment SC, and pixel data are generated for the part SGC common to both segments. This process, which is performed by the clipper 8 and the segment-to-pixel converter 9 in FIG. 1, is extremely simple and fast, and can readily be implemented using high-speed special-purpose hardware.

This completes the description of the novel clipping process. The steps of this process have been described in sequential order. Ignoring the order of steps, however, the process can be seen to comprise three main parts: the scan-conversion of the clip region to generate clip segment data, the scan-conversion of the subject figure and its conversion to pixel data, and the actual clipping process.

The scan-conversion of the subject figure and its conversion to pixel data are steps that must be performed in any case to output the subject figure, so including them in the clipping process does not require any extra hardware of software.

The scan-conversion of the clip region is similar to the scan-conversion of the subject figure. It can therefore be carried out by essentially the same hardware software, adding only a few functions to store the segment data in the scan memory 6 and the control data in the segment data control memory 7.

The actual clipping step, depicted in FIG. 13, requires only elementary operations. It can easily be performed as an adjunct to the conversion of the subject figure to pixel data.

The novel clipping process is therefore performable with high efficiency in terms of both hardware and software. In particular, even when the subject figure and/or the clip boundary are defined by high-order curves such as Bezier curves or spline curves, the novel clipping process does not require the solution of high-order algebraic equations as is necessary in the prior art. Marked improvements in processing speed can be anticipated.

Clip regions with highly irregular boundaries or interior holes present no special problems to the novel clipping process, these regions being reduced to segment data in the same way as other clipping regions. For these types of regions also, marked improvements in performance over the prior art are expectable.

Although the novel clipping process requires memory for the storage of segment data, the requirements are modest. Since the clip region is stored in the form of segment endpoint coordinates, it is stored in a compressed manner, requiring much less memory space than if it were to be stored as a bit-map mask, for example.

The scope of this invention is not limited to the embodiments described above, but encompasses many variations that will be obvious to one skilled in the art. Some of these variations are listed below.

Figure 14:
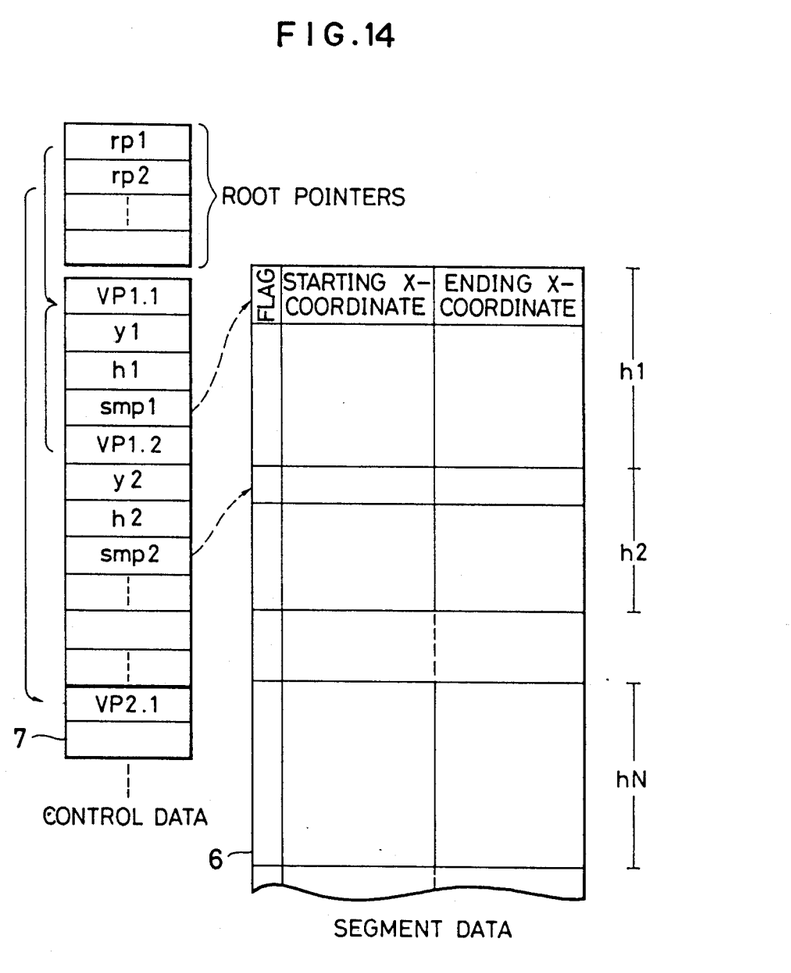
FIG. 14 is a schematic drawing illustrating the structure of the segment data memory when there are multiple clip regions.

(1) The clip region was described as being a single region bounded by a closed curve, but this invention can also be applied when there are multiple clip regions bounded by independent closed curves. These regions may be distinct, or they may overlap. This case can conveniently be handled by furnishing the segment data control memory 7 with a plurality of root pointers rp1, rp2, . . . corresponding to respective clip regions, as illustrated in FIG. 14, and storing the control data for each clip region in one area.

Instead of being a closed curve, the clip boundary can be a line or curve such as a parabola that extends to infinity (more precisely, to the limits of the device coordinate system). Clip segment data can still be generated by a DDA algorithm.

Figure 15:
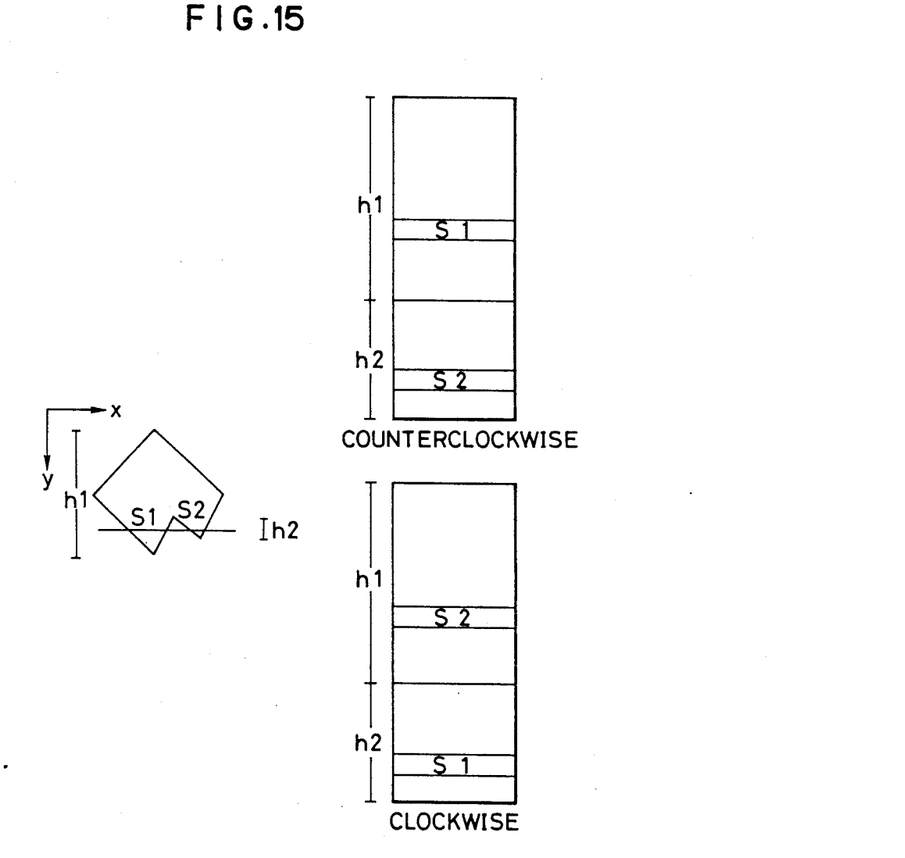
FIG. 15 is a drawing showing examples of the storage of segment data in different segment memory regions.

(2) When data are created for the segment data control memory, the clip boundary can be traced in either the clockwise or counterclockwise direction. The regions in which the segment data for different segments on the same scan are stored in the segment memory 6 will change as illustrated in FIG. 15. Similarly, data for segments on the same scan line can be stored in ascending or descending order of their x-coordinates, again causing the storage regions to change. None of these changes affect the ability of the segment memory 6 to store all the segment data.

(3) The novel clipping processor was depicted as having only one scan converter, so it was described as first converting the clip region to segment data and storing it in the segment memory 6, then converting the subject figure to segments and clipping them, but it is also possible to provide a plurality of scan converters, convert both the clip region and the subject figure to segments in parallel, and eliminate or simplify the segment memory.

(4) Instead of defining the starting and ending points of a segment, the segment data can define the segments in any other convenient way, such as by defining the segment starting point and length.

(5) The novel clipping process was described for the case in which the subject figure was a graphic primitive, but it is equally applicable to other subject figures, such as bit-mapped characters. In this case the actual clipping step consists in simply selecting for output those bits disposed between the starting and ending points of a clip segment. Bit-mapped pictorial images or virtual images can be similarly clipped.

(6) The novel clipping processor was furthermore described as receiving input of the clip region and subject figure in a coordinate system compatible with the raster output device, but it is possible to perform the clipping process in a user coordinate system and transform the results to device coordinates when the output pixel data are stored in the drawing memory 2.

(7) The segment data control memory 7 was described as being organized by a chain of pointers, but it can also be structured as an array, without using pointers.

What is claimed is:

1. A clipping process for clipping a subject figure expressed in an x-y coordinate system against a clip region bounded by a clip boundary, comprising the steps of:
 (a) receiving information defining said clip region, creating control data therefrom, and storing said control data in a segment data control memory;
 (b) from said control data and said information defining said clip region, scanning said clip region, decomposing said clip region into clip segments extending in the x-direction in said x-y coordinate system, creating clip segment data for said clip segments, and storing said clip segment data in a segment memory;
 (c) initializing a scan-line y-coordinate to the smallest y-coordinate of said clip region;
 (d) scanning said subject figure to obtain subject segments, extending in said x-direction, disposed on the scan line with said scan-line y-coordinate;
 (e) reading said clip segment data for said scan line from said segment memory, generating clipped segments by clipping said subject segments against said clip segment data, converting said clipped segments to pixel data, and outputting said pixel data;
 (f) deciding whether said subject figure has been completely scanned;
 (g) if a negative decision result is obtained in step (f), incrementing said scan-line y-coordinate by one and returning to step (d).

2. The clipping process of claim 1, wherein the step (a) comprises the steps of:
 proceeding around said clip boundary in a certain direction such as the counterclockwise direction, taking successive vertices on said clip boundary, and identifying alternate leading and trailing vertices, each leading vertex being paired with the trailing vertex that follows it; and
 for respective pairs of leading and trailing vertices, creating and storing in said segment data control memory a leading vertex pointer, a leading-vertex y-coordinate equal to the y-coordinate of the leading vertex in said pair, a word length equal to the number of scan lines between the leading and trailing vertices in said pair, and a segment memory pointer, said leading vertex pointers forming a chain.

3. The clipping process of claim 2, wherein step (b) comprises the steps of:
scanning said clip region and decomposing it into clip segments extending in said x-direction;
storing the x-coordinates of the starting and ending points of respective clip segments as clip segment data in said segment memory according to their y-coordinates, said segment memory pointers, and said leading-vertex y-coordinates; and
setting a flag to indicate that said clip segment data have been stored.

4. The clipping process of claim 3, wherein the x-coordinates of said starting and ending points are generated by a DDA algorithm.

5. The clipping process of claim 4, wherein an even-odd algorithm is used to discriminate between the inside and outside of said clip region.

6. The clipping process of claim 4, wherein a non-zero-winding algorithm is used to discriminate between the inside and outside of said clip region.

7. The clipping process of claim 2, wherein said step (a) comprises the steps of:
(a1) receiving data defining said clip boundary and storing it in an order such that said clip boundary can be traced in a certain direction;
(a2) initializing an index parameter to the value 1 and a segment memory parameter to the top address in said segment memory.
(a3) selecting a non-trailing vertex as an initial vertex and taking it as the current vertex;
(a4) deciding whether said current vertex is a leading vertex;
(a5) if a negative decision result is obtained in step (a3), taking the next vertex in said order as the current vertex.
(a6) deciding whether said current vertex is said initial vertex and returning to step (a4) if it is not;
(a7) if an affirmative decision result is obtained in step (a4), assigning the y-coordinate of said current vertex to an initial y-coordinate parameter, assigning said segment memory parameter to a segment memory pointer indexed by said index parameter, and storing said segment memory pointer in said segment data control memory;
(a8) deciding whether said current vertex is a trailing vertex;
(a9) if a negative decision result is obtained in step (a8), taking the next vertex in said order as the current vertex and returning to step (a8);
(a10) if an affirmative decision result is obtained in step (a8), assigning the y-coordinate of said current vertex to a final y-coordinate parameter;
(a11) subtracting said initial y-coordinate parameter from said final y-coordinate parameter, adding one, assigning the result to a word length indexed by said index parameter, storing said word length in said segment data control memory, and adding said word length to said segment memory parameter;
(a12) taking the next vertex in said order as the current vertex;
(a13) deciding whether said current vertex is an initial vertex;
(a14) if a negative decision result is obtained in step (a13), incrementing said index parameter by one and returning to step (a4);
(a15) if an affirmative decision result is obtained in step (a6) or step (a13), creating a chain of leading vertex pointers and storing them in said segment data control memory.

8. The clipping process of claim 4, wherein said step (b) comprises the steps of:
(b1) reading from said segment data control memory the leading-vertex y-coordinate of the first pair of leading and trailing vertices, and assigning it as an initial value to a scan-line y-coordinate.
(b2) initializing an index parameter to an initial value such as one.
(b3) scanning said clip region and obtaining the x-coordinates of the starting and ending points of one segment on the scan line with said scan-line y-coordinate;
(b4) reading from said segment control data memory said leading-vertex y-coordinate and word length indexed by said index parameter and deciding whether said scan-line y-coordinate is equal to or greater than said leading-vertex y-coordinate, but not greater than said leading-vertex y-coordinate plus said word length, minus one.
(b5) if a negative decision result is obtained in step (b4), incrementing said index parameter by one and returning to step (b4).
(b6) if an affirmative result is obtained in step (b4), reading said segment memory pointer indexed by said index parameter, storing the x-coordinates of said starting and ending points as clip segment data at an address equal to said segment memory pointer plus said scan-line y-coordinate, minus said leading-vertex y-coordinate, and setting a flag at this address;
(b7) incrementing said index pointer by one;
(b8) deciding whether such clip segment data have been stored for all segments on the scan line with said scan-line y-coordinate, and returning to step (b3) if they have not;
(b9) deciding whether such clip segment data have been stored for all scan lines intersecting said clip region;
(b10) if a negative result is obtained in step (b9), incrementing said scan-line y-coordinate by one and returning to step (b3).

9. The clipping process of claim 4, wherein said step (e) comprises the steps of:
(e1) initializing an index parameter to an initial value such as one;
(e2) reading said leading-vertex y-coordinate indexed by said index parameter, deciding whether it is equal to or less than said scan-line y-coordinate, and proceeding to step (e8) described below if it is not;
(e3) reading said word length indexed by said index parameter, deciding whether said scan-line y-coordinate is less than the sum of said leading-vertex y-coordinate and said word length, and proceeding to step (e8) described below if it is not;
(e4) subtracting said leading-vertex y-coordinate from said scan-line y-coordinate, then adding said segment memory pointer indexed by said index parameter to obtain an address in said segment memory;

(e5) reading the flag at said address in said segment memory, deciding whether said flag is set, and proceeding to step (e8) described below if it is not;

(e6) reading said clip segment data from said address in said segment memory;

(e7) clipping said subject segments against said clip segment data to generate clipped segments, converting said clipped segments to pixel data, and outputting said pixel data;

(e8) deciding whether said index parameter indicates the last leading vertex pointer in said chain of leading vertex pointers;

(e9) if a negative result is obtained in step (e8), incrementing said index parameter by one and returning to step (e2).

10. The clipping process of claim 2, wherein said leading vertex pointers are chained in ascending order of the y-coordinates of respective leading vertices.

11. A clipping processor for clipping a subject figure expressed in an x-y coordinate system against a clip region bounded by a clip boundary, comprising:

a bus for the interchange of data and address information;

a scan converter connected to said bus, for scan-converting said clip region and said subject figure, decomposing them respectively into clip segments and subject segments extending on scan lines in the x-direction in said x-y coordinate system, thus generating clip segment data and subject segment data;

a segment memory connected to said bus, for storing said clip segment data;

a segment data control memory connected to said bus, for storing control data describing the structure of said segment memory;

a clipper connected to said bus, for receiving subject segment data for the subject segments disposed on one scan line from said scan converter, receiving clip segment data describing a clip segment disposed on the same scan line from said segment memory, and generating clipped segments comprising those portions of said subject segments that are common to said clip segment;

a segment-to-pixel converter connected to said bus, for receiving said clipped segments from said clipper, converting said clipped segments to pixel data, and outputting said pixel data;

an arithmetic and logic unit connected to said bus, for performing arithmetic and logic operations when requested by other elements of said clipping processor;

a control unit connected to said bus, for controlling said scan converter, said clipper, and said segment-to-pixel converter, and for controlling access to said segment memory according to data stored in said segment data control memory.

12. The clipping processor of claim 11, wherein said control unit first causes said scan converter to scan-convert said clip region, then causes said scan converter to scan-convert said subject figure one scan line at a time, also causing said clipper and said segment-to-pixel converter to generate clipped segments and pixel data for each scan line as said subject figure is scanned.

13. The clipping processor of claim 11, wherein said segment memory comprises a plurality of words for storing the x-coordinates of the starting and ending points of respective clip segments.

14. The clipping processor of claim 13, wherein said segment memory also has flags for indicating whether said x-coordinates are stored in respective words.

15. The clipping processor of claim 11, wherein said segment data control memory comprises a root pointer and one or more blocks for storing a leading vertex pointer, a leading-vertex y-coordinate, a word length indicating the size of a region in said segment memory, and a segment memory pointer to the top of said region in said segment memory, respective leading vertex pointers forming a chain and said root pointer indicating the address of the first leading vertex pointer in said chain.

16. The clipping processor of claim 15, wherein said clip boundary comprises one or more closed curves, said leading vertex pointers form separate chains for respective closed curves, and said segment data control memory has separate root pointers for respective chains of leading vertex pointers.

* * * * *